(12) United States Patent
Shepard et al.

(10) Patent No.: US 9,843,262 B2
(45) Date of Patent: Dec. 12, 2017

(54) SYSTEMS AND METHODS FOR SWITCHED-INDUCTOR INTEGRATED VOLTAGE REGULATORS

(71) Applicant: THE TRUSTEES OF COLUMBIA UNIVERSITY IN THE CITY OF NEW YORK, New York, NY (US)

(72) Inventors: Kenneth L. Shepard, Ossining, NY (US); Noah Andrew Sturcken, New York, NY (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 0 days.

(21) Appl. No.: 15/182,100

(22) Filed: Jun. 14, 2016

(65) Prior Publication Data

US 2017/0110968 A1    Apr. 20, 2017

Related U.S. Application Data

(63) Continuation of application No. 14/172,210, which is a continuation of application No. PCT/US2012/051532, filed on Aug. 20, 2012.

(60) Provisional application No. 61/527,668, filed on Aug. 26, 2011.

(51) Int. Cl.
  *H02M 3/158*    (2006.01)
  *G06F 1/06*    (2006.01)

(52) U.S. Cl.
  CPC ............ *H02M 3/1584* (2013.01); *G06F 1/06* (2013.01)

(58) Field of Classification Search
  CPC ....... H02M 2001/0045; H02M 3/1584; H02M 3/1588; H02M 3/156; H02M 3/157
  USPC ............... 363/268, 272, 282, 283, 285, 351; 323/268, 272, 282, 283, 285, 351
  See application file for complete search history.

(56) References Cited

U.S. PATENT DOCUMENTS

| | | | | |
|---|---|---|---|---|
| 4,666,565 A | * | 5/1987 | Dobson | G01N 27/4045 204/412 |
| 5,485,118 A | * | 1/1996 | Chick | H03F 3/607 330/277 |
| 5,600,520 A | * | 2/1997 | Aokura | G11B 5/147 360/119.1 |
| 5,612,698 A | * | 3/1997 | Reay | H03M 1/181 341/155 |
| 5,837,392 A | * | 11/1998 | Katori | G11B 5/3109 204/192.2 |

(Continued)

*Primary Examiner* — Adolf Berhane
(74) *Attorney, Agent, or Firm* — Baker Botts L.L.P.

(57) ABSTRACT

Power controller includes an output terminal having an output voltage, at least one clock generator to generate a plurality of clock signals and a plurality of hardware phases. Each hardware phase is coupled to the at least one clock generator and the output terminal and includes a comparator. Each hardware phase is configured to receive a corresponding one of the plurality of clock signals and a reference voltage, combine the corresponding clock signal and the reference voltage to produce a reference input, generate a feedback voltage based on the output voltage, compare the reference input and the feedback voltage using the comparator and provide a comparator output to the output terminal, whereby the comparator output determines a duty cycle of the power controller. An integrated circuit including the power controller is also provided.

18 Claims, 13 Drawing Sheets

(56) References Cited

U.S. PATENT DOCUMENTS

| | | | | |
|---|---|---|---|---|
| 6,023,577 A * | 2/2000 | Smith, III | G06F 17/5036 | 703/14 |
| 6,141,632 A * | 10/2000 | Smith, III | G06F 17/5036 | 703/14 |
| 6,166,527 A * | 12/2000 | Dwelley | H02M 3/1582 | 323/222 |
| 6,281,737 B1 * | 8/2001 | Kuang | H03K 17/162 | 327/382 |
| 6,362,986 B1 * | 3/2002 | Schultz | H02M 3/158 | 363/132 |
| 6,429,684 B1 * | 8/2002 | Houston | H03K 19/0027 | 326/81 |
| 6,442,735 B1 * | 8/2002 | Joshi | G06F 17/5036 | 716/115 |
| 6,453,444 B1 * | 9/2002 | Shepard | G06F 17/5036 | 716/102 |
| 6,490,546 B1 * | 12/2002 | Kimmel | G06F 17/5036 | 703/14 |
| 6,567,773 B1 * | 5/2003 | Rahmat | G06F 17/5036 | 326/27 |
| RE38,140 E * | 6/2003 | Schaffer | H02M 3/1584 | 323/282 |
| 6,643,913 B2 * | 11/2003 | Uchikoba | H01F 17/0013 | 29/602.1 |
| 6,747,442 B2 * | 6/2004 | Olsen | H02M 3/1584 | 323/283 |
| 6,784,644 B2 * | 8/2004 | Xu | H02M 3/158 | 323/225 |
| 6,900,643 B2 * | 5/2005 | Deng | G01R 31/025 | 324/522 |
| 7,103,522 B1 * | 9/2006 | Shepard | G06F 17/5036 | 703/13 |
| 7,140,092 B2 * | 11/2006 | Park | H01F 17/0013 | 216/22 |
| 7,198,708 B2 * | 4/2007 | Atkinson | C12Q 1/004 | 204/403.01 |
| 7,300,757 B2 * | 11/2007 | Edman | B01J 19/0046 | 422/50 |
| 7,300,803 B2 * | 11/2007 | Lin | G01N 21/253 | 422/82.05 |
| 7,482,792 B2 * | 1/2009 | Burton | H02M 7/003 | 323/224 |
| 7,649,434 B2 * | 1/2010 | Xu | H01F 37/00 | 336/212 |
| 7,667,441 B2 * | 2/2010 | Muratov | H02M 3/1584 | 323/272 |
| 7,670,889 B2 * | 3/2010 | Pekarik | H01L 29/66901 | 438/151 |
| 7,852,185 B2 * | 12/2010 | Gardner | H01F 19/08 | 336/200 |
| 2002/0115857 A1 * | 8/2002 | Katagiri | C07D 209/52 | 544/243 |
| 2003/0078763 A1 * | 4/2003 | Chuang | G06F 17/5036 | 703/14 |
| 2003/0160675 A1 * | 8/2003 | Von Der Weth | H01F 17/045 | 336/178 |
| 2005/0040800 A1 * | 2/2005 | Sutardja | H02M 3/157 | 323/283 |
| 2006/0113922 A1 * | 6/2006 | Ribarich | H05B 41/2882 | 315/209 R |
| 2006/0115857 A1 * | 6/2006 | Keen | B82Y 10/00 | 435/7.1 |
| 2006/0152324 A1 * | 7/2006 | Haugs | G05F 1/32 | 336/210 |
| 2006/0172279 A1 * | 8/2006 | Smela | G01N 33/5044 | 435/4 |
| 2006/0181228 A1 * | 8/2006 | Sanchez-Olea | H05B 33/08 | 315/312 |
| 2006/0192536 A1 * | 8/2006 | Chen | H02M 3/157 | 323/222 |
| 2007/0142718 A1 * | 6/2007 | Abreu | A61B 3/1241 | 600/323 |
| 2007/0229192 A1 * | 10/2007 | Miura | H03H 9/0222 | 333/193 |
| 2008/0075975 A1 * | 3/2008 | Glaser | H01F 1/0027 | 428/693.1 |
| 2008/0246571 A1 * | 10/2008 | Guenther | H01F 3/04 | 335/297 |
| 2009/0094818 A1 * | 4/2009 | Smeys | H01F 17/0006 | 29/602.1 |
| 2009/0290442 A1 * | 11/2009 | Rajan | G11C 7/10 | 365/201 |
| 2009/0322296 A1 * | 12/2009 | Li | H02M 3/1584 | 323/282 |
| 2010/0300899 A1 * | 12/2010 | Levine | G01N 27/3277 | 205/792 |
| 2011/0067236 A1 * | 3/2011 | Muthukumar | H01L 21/486 | 29/852 |
| 2011/0111559 A1 * | 5/2011 | Mitchell | H01L 23/10 | 438/107 |

* cited by examiner

SYSTEMS AND METHODS FOR SWITCHED-INDUCTOR INTEGRATED VOLTAGE REGULATORS

CROSS REFERENCE TO RELATED APPLICATIONS

This application is a continuation U.S. patent application Ser. No. 14/172,210, filed Feb. 4, 2014, which is a continuation of International Application No. PCT/US2012/051532, filed Aug. 20, 2012, which claims priority to U.S. Provisional Application No. 61/527,668, filed Aug. 26, 2011, each of which is incorporated by reference herein in its entirety.

STATEMENT REGARDING FEDERALLY-SPONSORED RESEARCH

This invention was made with government support under grant DE-EE0002892 awarded by the Department of Energy and grant 0903466 awarded by the National Science Foundation. The Government has certain rights in this invention.

BACKGROUND

Power consumption can affect computational performance of microprocessors and systems-on-chip. Battery life, energy costs, and maximum operating temperature can each impose a power envelope on digital ICs that is generally mitigated by throttling computational performance. As such, performance-per-watt can be a useful metric for comparing energy efficiency of a processor. Dynamic voltage and frequency scaling (DVFS) can provide improved performance-per-watt by reducing supply voltages during periods of low computational demand, but implementations can be improved by reducing the time scales over which the supply voltage is positioned, allowing real-time adjustment of power consumption in the presence of workload variability. For the case of chip multiprocessors and heterogeneous systems-on-chip (SoCs), computational logic can be generally divided into individual voltage-frequency domains, allowing per-core or per-functional-block DVFS. Generally, a DVFS implementation with faster voltage transition times and smaller voltage-frequency domains delivers a relatively more energy-efficient implementation. However, some methods for power supply regulation with board-level voltage regulator modules (VRM) can require tens of microseconds to transition voltages and can be too bulky to deliver many independent power supplies in a cost effective manner.

External VRMs can present other efficiency challenges. For example, $I^2R$ losses in the power distribution network (PDN) can be significant when relatively highly-scaled voltages are delivered from the board. In certain PDNs, a resistance from the VRM to the CPU's package of 0.7 m$\Omega$ can dissipate 7 W of power for 100 W load at 1 V. Further, VRMs utilize power supply margins that can degrade energy efficiency. The high-frequency impedance of the PDN can inhibit the VRM's ability to suppress voltage overshoot in the event of load current transients. As such, VRM specifications can stipulate that the supply voltage follow a load-line represented as $v_{OUT}=V_{ZL}-R_{LL}i_O$, where $v_{OUT}$ represents the processor supply voltage, $V_{ZL}$ represents the desired $v_{OUT}$ at zero load, $R_{LL}$ represents the desired load-line resistance, and $i_O$ represents the load current. Implementation of load-line control can reduce the VRM size and cost required to maintain the output voltage within the allowed tolerance during load transients. However, for example when the system is not operating at maximum power consumption, the load-line can be a source of inefficiency as $v_{OUT}$ can be greater than the minimum supply voltage, $V_{MIN}=V_{ZL}-R_{LL}I_{O,MAX}$, where $I_{O,MAX}$ represents the maximum load current. The wasted power can be represented as $P_{LL}=i_OR_{LL}(I_{O,MAX}-i_O)$. For a value for $R_{LL}$ of 1 m$\Omega$, a CPU with $I_{O,MAX}$ of 100 A operating at 50 A and 1 V can waste 2.5 W in the load-line implementation. If the PDN impedance were smaller, the value of $R_{LL}$ and hence the load-line inefficiency could be reduced.

Switch-mode integrated voltage regulators (IVRs) can be utilized to address these challenges in VRMs. For example, energy can be stored on or close to the integrated circuit in capacitors (switched-capacitor converters) or inductors (buck converters). Integrated switched-capacitor converters, which can take advantage of high-density integrated capacitors, can have relatively high efficiency at reasonable current densities, but at a fixed conversion ratio and without addressing transient requirements. Meanwhile, integrated buck converters can have high current densities and efficiencies with a continuous range of conversion ratios, but can be challenging to integrate with high-quality inductors.

Planar spiral or other inductor topologies that can be constructed using the interconnects of a typical CMOS process can be too resistive to provide efficient on-chip power conversion at reasonable current densities. Surface mount technology (SMT) air-core inductors, which can provide a current density up to ~1.7 A/mm$^2$, can be utilized. However, the size and discrete nature of these devices can hinder the scalability of IVRs incorporating discrete SMT inductors. Nevertheless, some integrated magnetic-core power inductors can be relatively highly scalable and capable of delivering current densities up to 8 A/mm$^2$ or more. These inductors can be included in IVR prototypes by on-chip integration and chip stacking, which can provide highly scalable and efficient switched-inductor IVRs.

Another issue in the development of switched-inductor IVRs can be the integration of decoupling capacitance. While VRMs can generally augment voltage regulation at high frequencies by leveraging large amounts of inexpensive board-level decoupling capacitance, the integrated capacitance utilized in IVRs can be much greater. In switched-inductor IVRs, decoupling capacitance can be determined to suppress voltage overshoot during fast load current transients. Extending the IVR controller bandwidth can reduce these decoupling capacitance effects.

Some switched-inductor IVRs can address transient response by utilizing a multi-phase hysteretic controller to provide nearly instantaneous response to transients, which can effectively reduce the required output decoupling capacitance. However, the closed loop behavior of the multi-phase hysteretic controller can be difficult to predict and can have loose synchronization of phases producing an under-damped large-signal response. Also, certain hysteretic controllers do not operate at fixed switching frequency, and can therefore pose challenges when attempting to control EMI. Pulse-width modulation (PWM) controllers can be utilized, which can compensate for increased controller delay using abundant package-level decoupling capacitance. However, the package-level capacitance can increase component and packaging cost and reduce scalability.

SUMMARY

Systems and methods for a power controller are provided herein.

In one embodiment of the disclosed subject matter, a power controller includes an output terminal having an output voltage, at least one clock generator to generate a plurality of clock signals and a plurality of hardware phases. Each hardware phase is coupled to the at least one clock generator and the output terminal and includes a comparator. Each hardware phase can be configured to receive a corresponding one of the plurality of clock signals and a reference voltage, combine the corresponding clock signal and the reference voltage to produce a reference input, generate a feedback voltage based on the output voltage, compare the reference input and the feedback voltage using the comparator and provide a comparator output to the output terminal, whereby the comparator output determines a duty cycle of the power controller.

In some embodiments, the plurality of hardware phases includes four hardware phases, and the plurality of hardware phases can included unlatched hardware phases. Each of the plurality of clock signals can have a different phase.

In some embodiments, the reference input can include a triangle wave potential, which in some embodiments can be centered at a desired DC output voltage of the power controller.

In some embodiments, the power controller can include a bridge switching node having a bridge switching node voltage, and the feedback voltage can be further based on the bridge switching node voltage. The bridge switching node voltage can be determined from an inductor current of the bridge switching node.

In some embodiments, the comparator can be an unlatched continuous comparator.

According to another aspect of the disclosed subject matter, an integrated circuit chip can include the power controller having any of the features described above. In some embodiments, the integrated circuit chip can include one or more network-on-chip coupled to the power controller. The one or more network-on-chip can include four networks-on-chip, each network-on-chip having 64 cores.

According to another aspect of the disclosed subject matter, a method includes, for each one of a plurality of hardware phases, each hardware phase being coupled to at least one clock generator and an output terminal and including a comparator, receiving a corresponding one of a plurality of clock signals from the at least one clock generator and a reference voltage, combining the corresponding clock signal and the reference voltage to produce a reference input, generating a feedback voltage based on an output voltage from an output terminal, comparing the reference input and the feedback voltage using the comparator and providing a comparator output to the output terminal, whereby the comparator output determines a duty cycle of a power controller.

In some embodiments, the method further includes providing the plurality of clock signals, each of the plurality of clock signals having a different phase.

In some embodiments, the method further includes providing the reference input, wherein the reference input includes a triangle wave potential. Providing the reference input can include centering the triangle wave potential at a desired DC output voltage of the power controller.

In some embodiments, generating the feedback voltage further includes generating the feedback voltage based on a bridge switching node voltage from a bridge switching node. The method can further include determining the bridge switching node voltage from an inductor current of the bridge switching node.

DETAILED DESCRIPTION

The systems and methods described herein are useful for high bandwidth voltage regulation of an integrated voltage regulator, and to provide relatively stable and predictable small signal response and rapid response to large load current transients.

Figure 1:
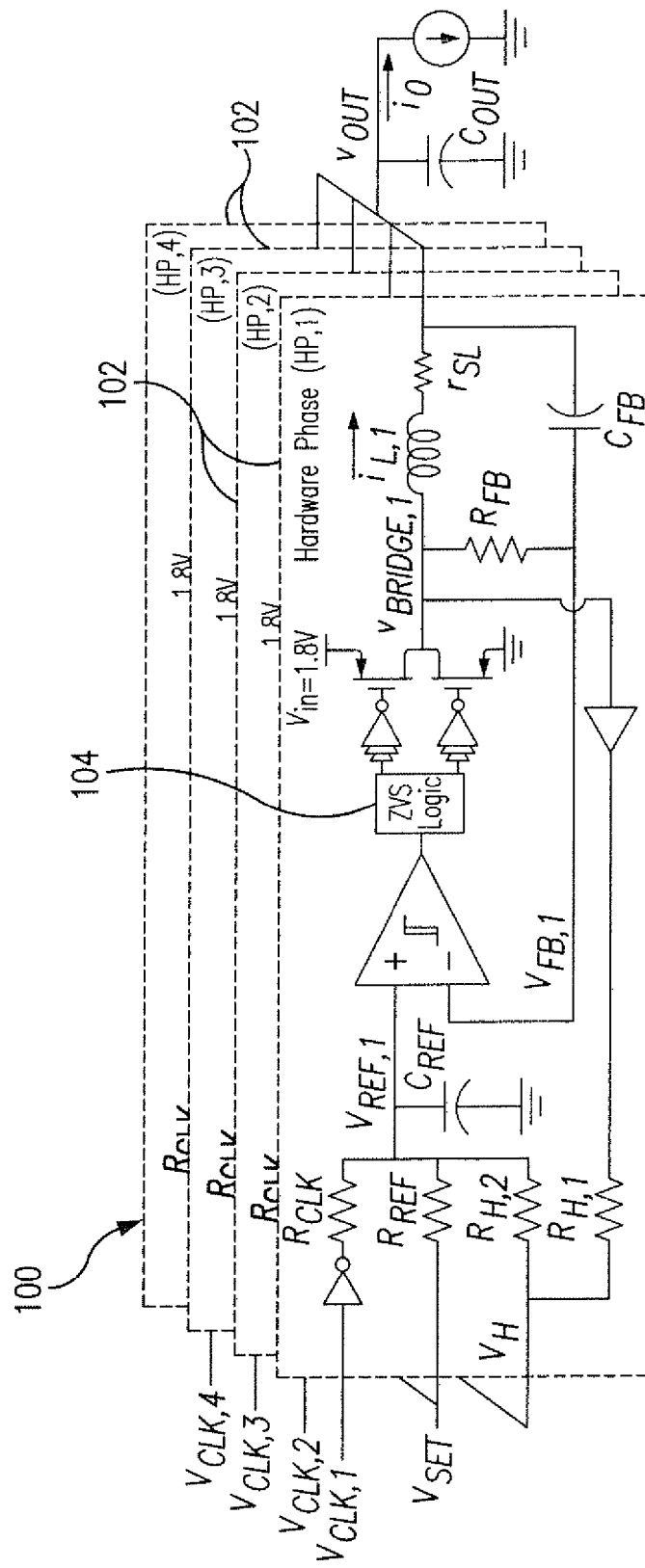
FIG. 1 is a diagram of an exemplary power controller according to the disclosed subject matter.
Figure 2:
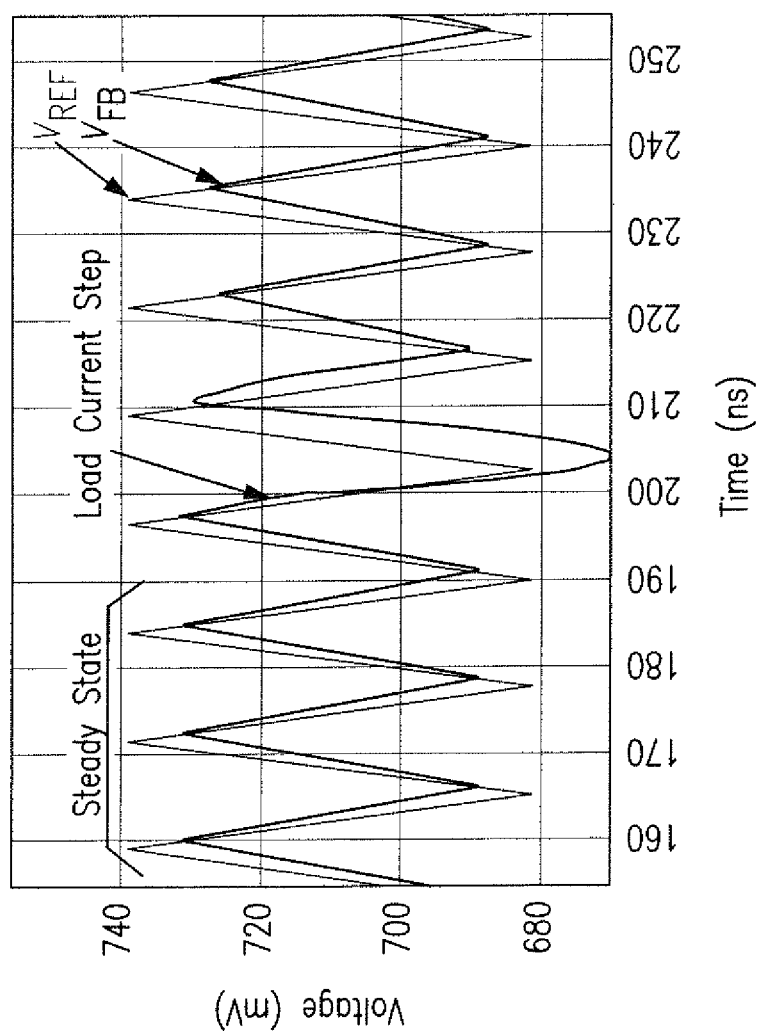
FIG. 2 is a diagram illustrating further features of the power controller of FIG. 1.

FIG. 1 shows an example power controller 100 according to the disclosed subject matter. The power controller 100, for example and embodied herein as a four-phase interleaved buck converter, can include four similarly-configured hardware phases 102 (HPs) along with clock generation circuitry that provides the switching frequency and phase for each of the HPs, $v_{CLK,1-4}$. In each HP, $v_{CLK}$ can be superimposed onto a DC reference voltage, $v_{SET}$, via $R_{CLK}$, to create a triangle wave reference input to the controller, $v_{REF}$, which can be centered at a desired DC output voltage, represented as $$v_{REF,DC} = V_{SET} \frac{R_{CLK}}{R_{REF} + R_{CLK}} + \frac{V_{in}}{2} * \frac{R_{REF}}{R_{CLK} + R_{REF}} \quad (1)$$

as shown in FIG. 2. The feedback voltage, $v_{FB}$, can be a superposition of the bridge switching node voltage, $v_{BRIDGE}$, at low frequencies and the output voltage, $v_{OUT}$, at high frequencies. The comparison of $v_{REF}$ and $v_{FB}$ at the continuous comparator 102, which can be configured for reduced delay, can determine the steady state duty-cycle, D, represented as $$D = \frac{V_{REF} + \frac{1}{2} v_{ref,p-p}}{V_{in} + v_{ref,p-p}} \quad (2)$$

The DC output resistance, $R_{OUT}$, of the IVR can be tuned by $R_{H,1}$ and $R_{H,2}$. As the load current increases, the feedback loop can cause the duty cycle to increase, which can compensate for the increase in voltage drop across the bridge switches. The duty cycle can be buffered and can drive $R_{H,1}$. As such, $v_{REF}$ can slightly increase, offsetting the increased voltage drop across the inductor resistance at higher current. This tuning of the DC output resistance can be represented by $$R_{OUT} = \tau'_{sl} - \tau'_{mos}\frac{R_{H,1} + R_{H,2}}{R_{REF} \| R_{CLK}} \quad (3)$$

where $\tau_{mos,n}$ and $\tau_{mos,p}$ can represent, respectively, the effective series resistance of NMOS and PMOS bridge switches for an HP and $\tau_{sl}$ can represent the effective series resistance of a single inductor, such that $$\tau'_{sl} = \frac{\tau_{sl}}{N} \text{ and} \quad (4)$$

$$\tau'_{mos} = \frac{D^*\tau_{mos,p} + (1-D)*\tau_{mos,n}}{N} \quad (5)$$

Accordingly, the DC output voltage can follow the load-line, represented as $$v_{OUT} = DV_{in} - R_{OUT}I_O \quad (6)$$

The time constant, $R_{FB}C_{FB}$, can be configured to be slightly longer than $R_{CLK}C_{REF}$ such that, in steady state, $v_{FB}$ can slew behind $v_{REF}$, as shown for example in FIG. 2. In the event of a load current step, $\delta v_{OUT}/\delta t$ across $C_{OUT}$ can couple through $C_{FB}$, and can cause $v_{FB}$ to cross $v_{REF}$. As such, the comparators can switch state and the bridge can apply the appropriate voltage at $v_{BRIDGE}$. Each of the HPs 102 can respond asynchronously, such that the ensemble can be configured to exert a maximum di/dt within a fraction of the switching period. When an HP 102 becomes unsynchronized, the difference between $v_{FB}$ and $v_{REF}$ can be larger, and thus the sensitivity of the HP 102 to $dv_{OUT}/dt$ can be reduced, driving the HP 102 back to more suitable synchronization. In this manner, the controller can substantially simultaneously provide near immediate asynchronous response to load transients and relatively strong synchronization between HPs 102 in steady state.

Figure 3:
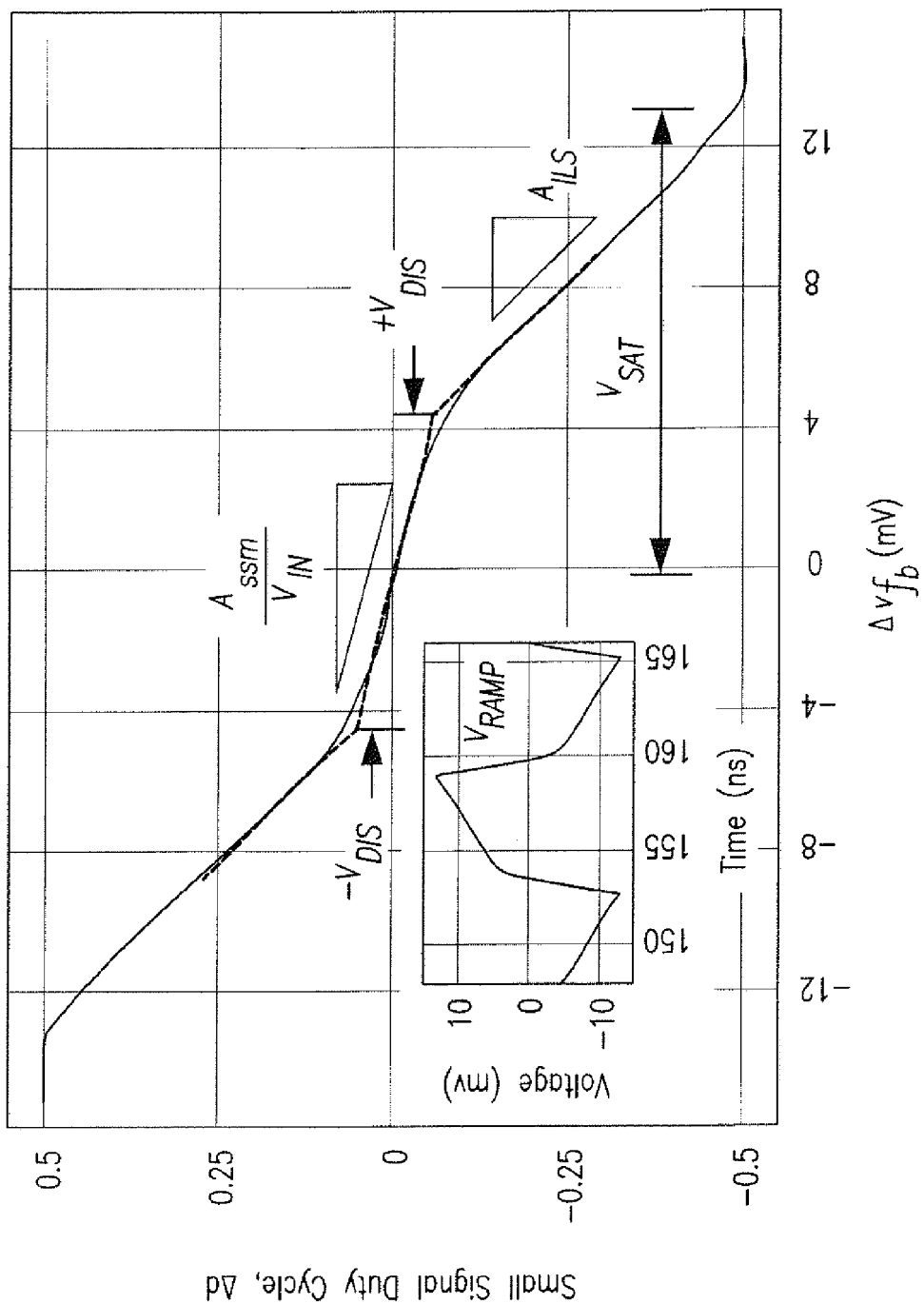
FIG. 3 is a diagram illustrating further features of the power controller of FIG. 1.

Small-signal dynamics can be determined using a combination of conventional linear circuit analysis and circuit averaging, where the frequency content of a small-signal perturbation, $\Delta v_{FB}$, can be sufficiently below $Nf_{sw}$ for averaging to be valid. The small-signal, steady state gain, $A_{SSM}$, of the comparator stage can be similar to a conventional PWM modulator, except in some embodiments, both $v_{REF}$ and $v_{FB}$ can have large signal components at $f_{sw}$ in steady state, as shown for example in FIG. 2, and thus, the effective PWM ramp signal can be represented as $v_{RAMP} = v_{REF} - v_{FB}$, as shown for example in FIG. 3, inset. $A_{SSM}$ can be inversely proportional to the slope of $v_{RAMP}$, at the intersection with $\Delta v_{FB}$. FIG. 3 shows the feedback gain, the small signal change in the duty cycle, $\Delta d$, as a function of $\Delta v_{FB}$. The discontinuity in the feedback gain can occur at $V_{DIS}$, which can be represented as $$V_{DIS} = V_{in}\left(\frac{1}{2R_{CLK}C_{REF}} + \frac{1}{2'R_{FB}C_{FB}}\right) \times \left(\frac{T_{sw}}{4}\left(1 - \frac{R_{CLK}C_{REF}}{R_{FB}C_{FB}}\right) + t_{cd}\right) \quad (7)$$

where $t_{cd}$ can represent circuit delay through the continuous comparator 104, ZVS logic and bridge switches. When $|\Delta v_{FB}| < V_{DIS}$, the gain through the comparator 104 can be linear and represented as $$A_{SSM} \approx \frac{4*f_{sw}}{\frac{1}{R_{CLK}C_{REF}} + \frac{1}{R_{FB}C_{FB}}} \quad (8)$$

For larger deviations, $|\Delta v_{FB}| > V_{DIS}$, the gain through the comparator 104 can be non-linear and increasing, which can provide improved transient response. The instantaneous gain for $|\Delta v_{FB}| > V_{DIS}$ can be represented as $$A_{ILS} \approx \frac{4*f_{sw}}{\frac{1}{R_{CLK}C_{REF}} + \frac{1}{R_{FB}C_{FB}}} \quad (9)$$

Figure 4:
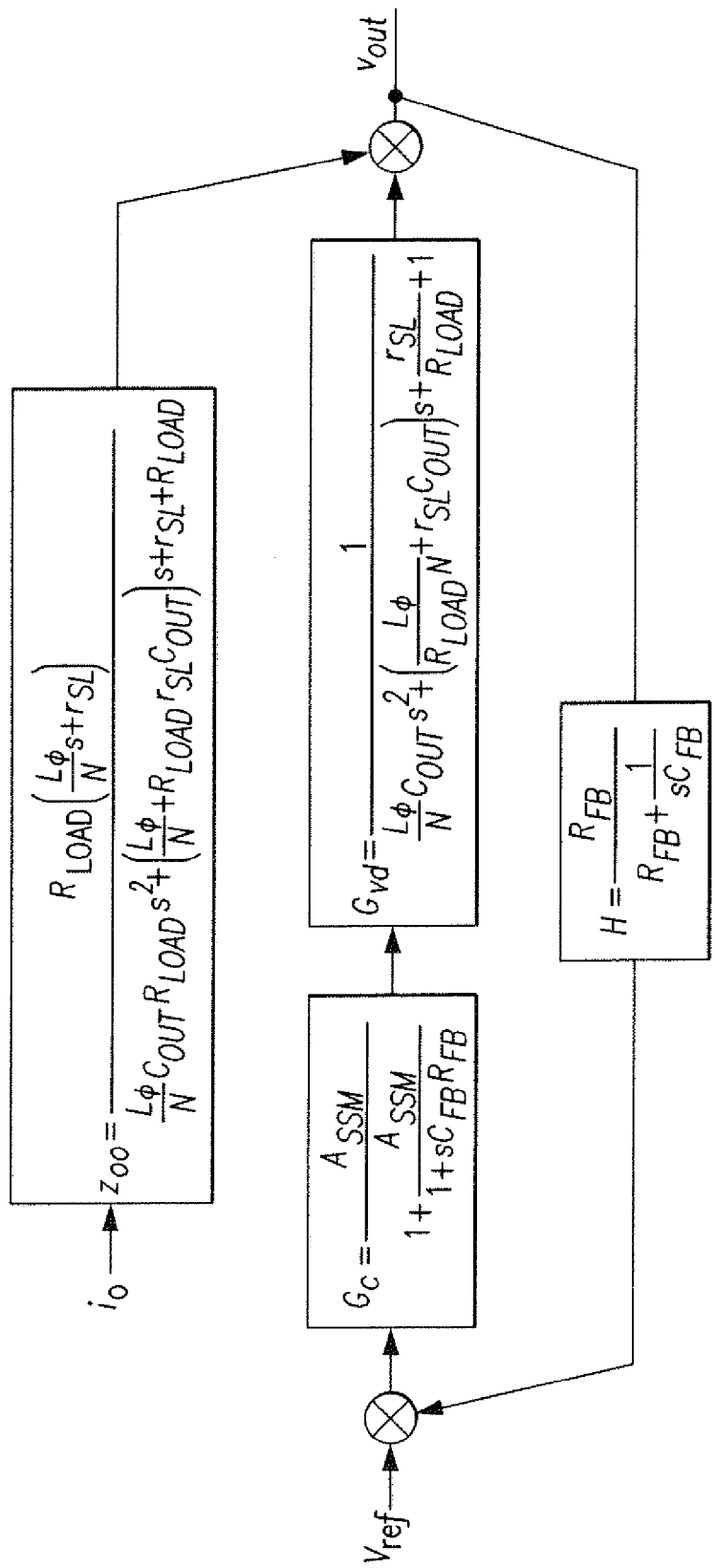
FIG. 4 is a diagram illustrating further features of the power controller of FIG. 1.
Figure 5:
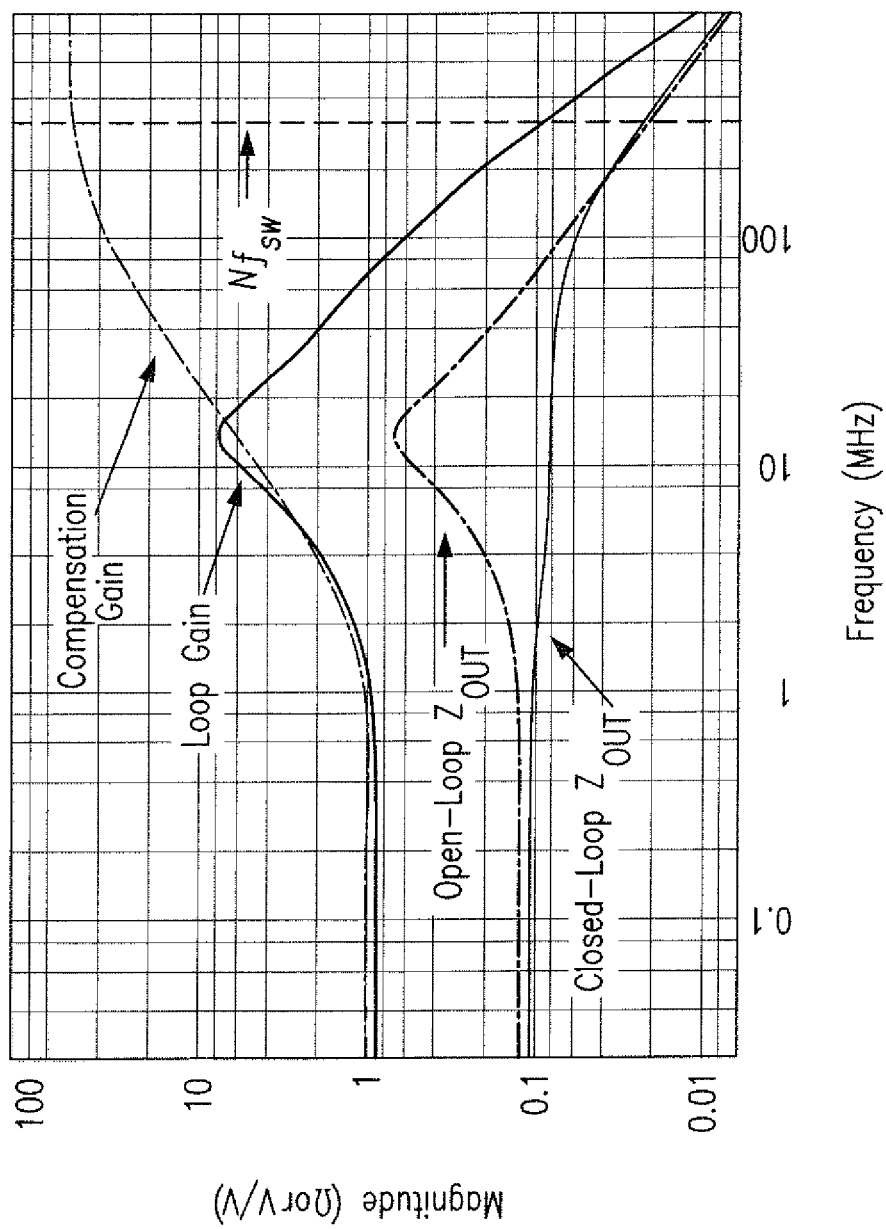
FIG. 5 is a diagram illustrating further features of the power controller of FIG. 1.

The remainder of the loop transfer function can be determined with linear circuit analysis. The small signal model, transfer functions and output impedance are shown in FIGS. 4-5. Comparing the open-loop and closed-loop output impedances, the controller 100 can be shown to regulate the output to a dynamic load-line. In some embodiments, the ESR zero can occur above 100 GHz, beyond the range shown in FIG. 5, with the output capacitor implemented with on-chip MOS capacitance.

Capacitor technologies can include low-inductance discrete ceramic capacitors, on-chip MOS capacitors, and on-chip deep-trench (DT) capacitors, and each can offer reduced effective series resistance (ESR) and effective series inductance (ESL) relative to the capacitors typically used with VRMs. The high-frequency impedance of low-inductance discrete (LID) capacitors such as land-grid-array or interdigitated capacitors can largely include ESL with self-resonant frequencies (SRF) around 30 MHz, where $SRF = 1/2\pi\sqrt{ESL*C_{OUT}}$. In contrast, the distributed nature of on-chip MOS and DT capacitance can result in reduced ESL with a high-frequency impedance largely including ESR with time constants, $\tau_C = ESR*C$, for example about 1 ps for MOS capacitors and about 500 ps for DT capacitors, which can depend on resistance of the on-chip PDN.

With relatively wide impedance variability of candidate IVR capacitor technologies, the output voltage ripple and other design parameters dependent on the high-frequency output impedance can be determined using a general model. The total peak-to-peak inductor current ripple can be represented as $$\Delta I_{L,p-p} = \frac{V_{IN}T_{SW}D^*(1 - ND^*)}{L\phi} \quad (10)$$

where $V_{IN}$ represents the buck converter input supply voltage, $T_{sw}$ represents the switching period, N represents the number of phases in a multi-phase converter, $D^* = \text{mod}(D, 1/N)$, and $L_\phi$ represents the filter inductance of each phase. The expression for output voltage ripple, including the effects of ESL, can be represented as:

$$\Delta V_{OUT,p-p} \approx \frac{\Delta I_{L,p-p}}{C_{OUT}}\sqrt{\left(\frac{T_{sw}}{8N} - \frac{N}{8T_{sw}SRF^2}\right)^2 + \tau_C^2} \quad (11)$$

using a simple lumped RLC model for the output capacitor.

The relatively low ESR of ceramic capacitors generally can require the output voltage to follow a dynamic load-line $$v_{OUT} \rightarrow V_{ZL} - R_{LL}I_O \quad (12)$$

where the output impedance can be represented as $$Z_{LL} = R_{LL} \frac{1 + s\tau_C}{1 + sR_{LL}C_{OUT}} \quad (13)$$

This result can also apply to IVRs that use on-chip MOS or DT capacitance. The dynamic load-line can be implemented by having the controller regulate the output impedance of the converter to until the unity-gain frequency, $f_C$, at which point $C_{OUT}$ can dominate the output impedance, and thus can constrain the output capacitance to $$C_{OUT} \geq \frac{1}{2\pi f_C R_{LL}} \quad (14)$$

Increasing $f_C$ can reduce the requirement on $C_{OUT}$. However, one guideline for a maximum loop-gain bandwidth that can avoid instability in closed-loop operation can be represented as $$f_C \leq \alpha N f_{sw} \quad (15)$$

where $f_{sw}$ can represent the switching frequency and $\alpha$ can represent a constant commonly chosen as <1/6. Switching losses can become appreciable at high frequencies, effectively constraining $f_{sw}$; nevertheless, IVRs can operate efficiently with $f_{sw}$ about 100 MHz. Combining eq. (14) and eq. (15) produces the constraint on $C_{OUT}$ for load-line regulation with on-chip MOS or DT capacitance, which can be represented as $$C_{OUT} \geq \frac{1}{2\pi \alpha N f_{sw} R_{LL}} \quad (16)$$

True load-line regulation can be difficult to achieve with low-inductance discrete capacitors when $f_C$ exceeds the capacitor SRF, which is generally the case for IVRs. ESL can dominate at frequencies above $f_C$, which can result in an appreciable first droop at the onset of a large $di_O/dt$ event. However, dynamic load-line regulation can be implemented by adding series resistance to the relatively low-inductance discrete capacitors. The discrete capacitance, represented as $C_{OUT,LID}$, can be accompanied by an added series resistance, $ESR_{ADD,LID}$, and an additional on-chip capacitance, $C_{OUT,O-C}$. These values can be chosen according to $$R_{LL} = ESR_{ADD,LID} + \frac{\tau_{C,LID}}{C_{OUT,LID}} \quad \text{and} \quad (17)$$

$$\frac{1}{C_{OUT,LID}(2\pi SRF_{LID})^2 R_{LL} C_{OUT,O-C}} \leq R_{LL}. \quad (18)$$

In this manner, a balance between on-chip and off-chip decoupling capacitance that is cost-effective can be achieved.

While the load-line constraint on output capacitance can result in the desired small-signal output impedance, the duty cycle, and hence the controller response, can saturate, for example in the event of a large load-current step, $\Delta I_O$. As such, the saturated response of the controller can be insufficient to prevent the output voltage from overshooting the load-line, and thus, the output capacitor can be utilized to provide additional support. The minimum capacitance (the so-called "critical capacitance") that can limit voltage overshoot to $\Delta V_{OS}$ during worst-case load-current transients can be represented as $$C_{CRIT} = \left(\frac{t_L}{2} + \frac{\tau_C^2}{2t_L} + t_d - \tau_I\right) \bigg/ \left(R_{LL} + \frac{\Delta V_{OS}}{\Delta I_O}\right) \quad (19)$$

for $L_\phi > L_{CRIT}$, and $$C_{CRIT} = (\tau_C + t_d - \tau_I) \bigg/ \left(R_{LL} + \frac{\Delta V_{OS}}{\Delta I_O}\right)$$

for $L_\phi \leq L_{CRIT}$ where $L_{CRIT} = N\tau_C V_L^*/\Delta I_O, t_L = L_\phi \Delta I_O/V_L^*N$, $V_L^* = \min(V_{IN} - V_{OUT}, V_{OUT})\tau_I$ can represent the load step time constant and $t_d$ can represent the delay time for the controller to saturate the duty cycle. This expression can apply to IVRs using on-chip decoupling capacitance, where typically $L_\phi > L_{CRIT}$. For IVRs using low-inductance discrete capacitors with values selected in accordance with eq. (17) and eq. (18), the critical capacitance can be determined from eq. (19) with $\tau_{C,LID,TOT} = ESR_{ADD,LID} * C_{OUT,LID} + \tau_{C,LID}$ used to represent $\tau_C$.

Table 1 shows specifications for an exemplary IVR. A parameter for minimum output capacitance using either LID or on-chip DT or MOS capacitance for the exemplary IVR of Table 1 can be load-current transient response. For an IVR with linear feedback, the value $f_d$ of can be represented as $$t_{d,lfb} = \sqrt{\frac{V_{in} C_{OUT}}{f_C \Delta I_O}} \quad (20)$$

For the exemplary IVR of Table 1, $t_d$ dominates the numerator with a value of 154 ns, relative to 6.5 ns and 19 ps for the terms $t_L/2$ and $\tau_C^2/2t_L$ respectively. As such, controller delay can be a bottleneck in reduction of $C_{OUT}$ for IVRs with conventional feedback controllers. Therefore, control techniques that extend controller bandwidth while maintaining stable operation can allow for reduction in $C_{OUT}$. Load-current feedforward can be an effective means to extend bandwidth for VRMs. However, in the integrated context, load-current estimation can be challenging due to the distributed nature of decoupling capacitors, high variability of on-chip resistors and capacitors, and parasitic poles introduced by analog amplifiers at high-frequencies.

TABLE 1

Exemplary IVR Specifications

| | | |
|---|---|---|
| $V_{IN}$ | input voltage | 1.8 V |
| $I_{O,MAX}$ | max. load current | 1.2 A |
| $\Delta I_O$ | max. dynamic load step | 600 mA |
| $\tau_I$ | load step time constant | 100 ps |
| $\Delta V_{OS}$ | Max. transient overshoot | 40 mV |
| $R_{OUT}$ | closed loop output resistance | 125 mΩ |
| $f_{SW}$ | switching frequency | 80 MHz |
| N | number of phases | 4 |
| L | inductance per phase | 26 nH |

Those skilled in the art will appreciate that the described dimensions and values are exemplary, and that alternative configurations can readily be chosen. For example, an IVR according to the disclosed subject matter can be configured to receive an input voltage from 1V to 12V. The IVR can be configured to handle a load current from 0.1 A to 100A and dynamic load step from 0.05 A to 50 A with a load step time constant from 100 ps to 10 ns. The IVR can be configured to handle a transient overshoot from 10 mV to 100 mV. The IVR can be configured to operate at a switching frequency from 1 MHz to 1 GHz, and have 2 to 64 phases with 4 nH to 1 uH per phase.

According to another aspect of the disclosed subject matter, the control scheme described herein can achieve relatively high feedback bandwidth using a combination of unlatched PWM modulation, nonlinear feedback gain, and high linear feedback bandwidth relative to the effective switching frequency ($f_C \sim Nf_{sw}/5$). Controllers with such features can be relatively sensitive to noise and/or prone to chaotic behavior, which can cause unpredictable switching, potentially degrading efficiency and output voltage regulation. Modeling and simulation of the proposed controller was conducted with Matlab and Spectre to verify stability and the lack of bifurcations and strange attractors in the converter operation. Nevertheless, other factors, such as inductor or device mismatch, can upset the balance between HPs 102 and cause multiple switching. Thus, a power converter 100 according to the disclosed subject matter, implemented as a four-phase buck converter, was designed and fabricated on a test chip in a 45 nm SOI process to verify proper converter operation. The converter 100 can provide a regulated supply voltage to a digital load in the form of four 64-tile networks-on-chip (NoC) 202 and a programmable current source capable of generating load-current steps of about 1 A with slew rates of about 1 A/100 ps.

Figure 6:
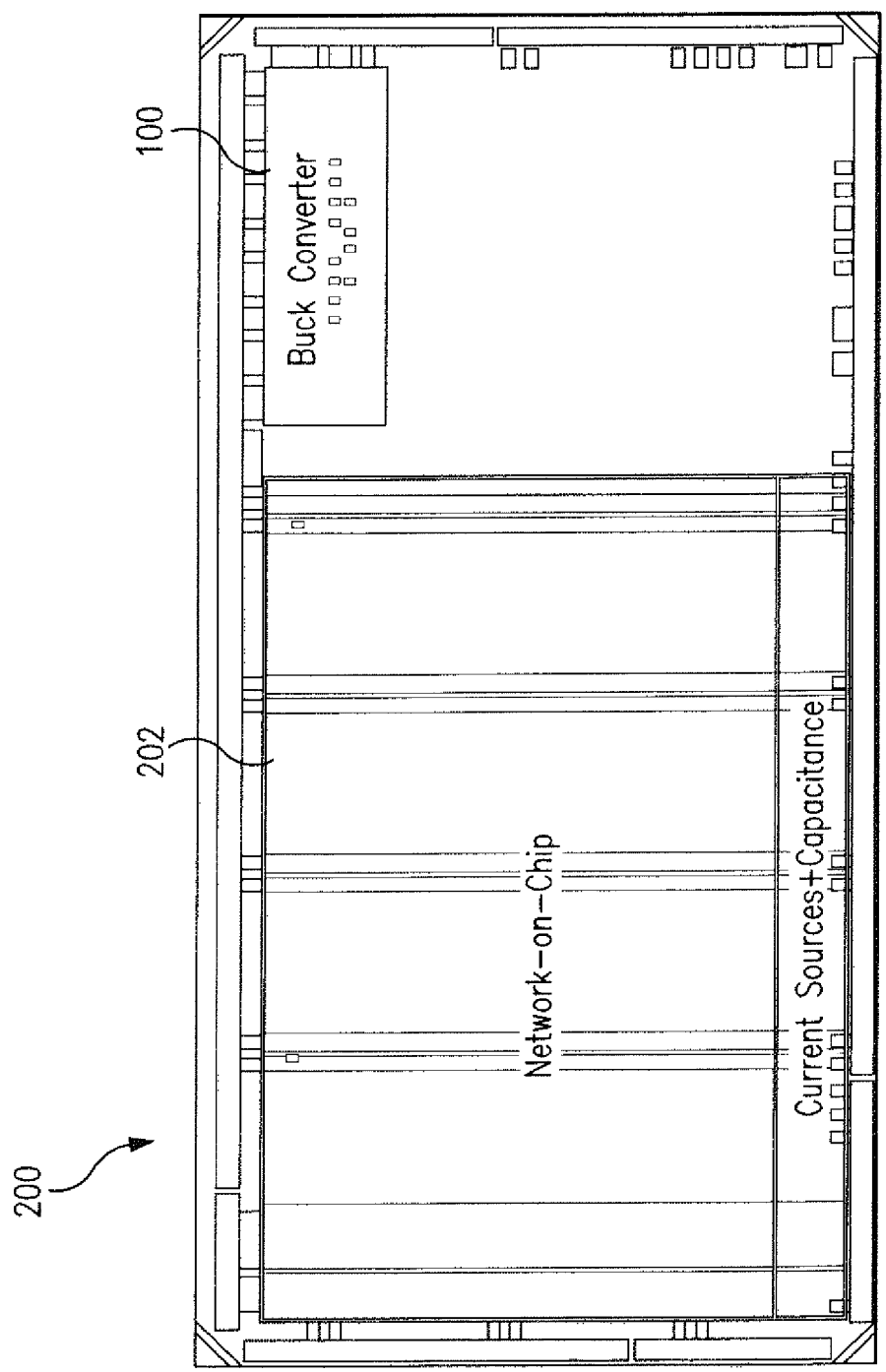
FIG. 6 is a diagram illustrating an exemplary integrated circuit according to the disclosed subject matter.

An exemplary integrated circuit chip 200 including the power converter 100 is shown in FIG. 6, embodied herein with dimensions of 3 mm by 6 mm. However, a power converter 100 according to the disclosed subject matter can be suitably configured to having any dimensions with an area from 1 mm$^2$ to 100 mm$^2$. The exemplary chip 200 embodied herein can have an area of about 0.75 mm$^2$ including all input and output decoupling capacitance (or about 0.32 mm$^2$ excluding these capacitors). The chip 100 can operate with a switching frequency $f_{sw}$=80 MHz and voltage ripple <1 mV, and can support a substantially continuous range of conversion ratios from a 1.5 V supply with a load current as high as 1.25 A. The bridge switches can be thick-oxide floating body FETs, where the widths can be configured for 80 MHz switching and 300 mA per phase. A discretely programmable dead-time can be added to the NMOS turn-on transition, allowing zero voltage switching (ZVS) when $v_{BRIDGE}$ transitions from high to low. The continuous comparators 104 can have an adjustable hysteresis ranging from 5 mV to 30 mV to reduce chatter. An independent 1 V supply can power the control circuitry and can be isolated from the bridge power supply to prevent switching noise form disturbing the controller.

Figure 7:
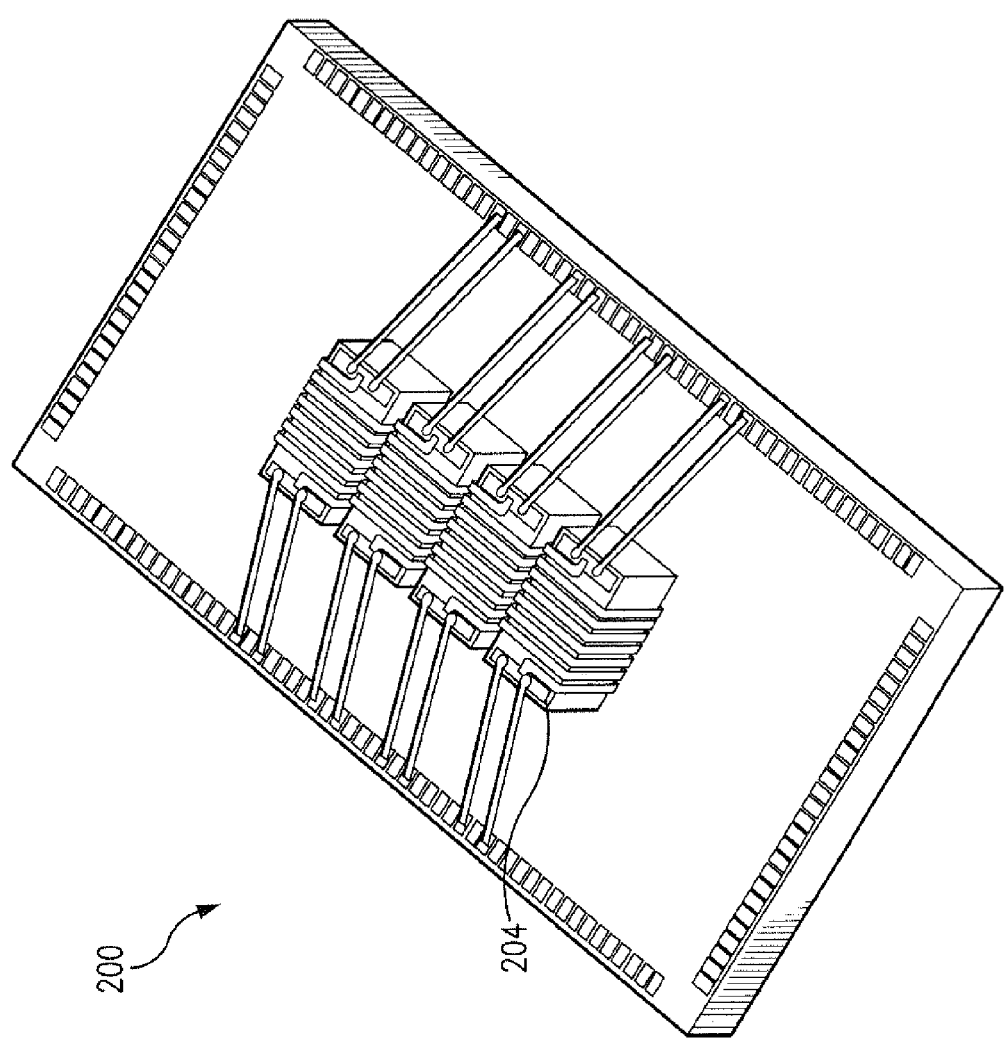
FIG. 7 is a diagram illustrating further features of the integrated circuit of FIG. 6.

Four 26 nH, SMT-0402 air-core inductors 204 can be integrated on top of the chip 200 by bondwire connections, as shown for example in FIG. 7. The inductance value can be chosen to reduce current ripple, such that the converter 100 efficiently operates in continuous conduction mode at $f_{sw}$ of 80 MHz and of $i_O$ of 500 mA. The total controller delay during a load transient can be up to about 700 ps according to simulation, with about 325 ps for $v_{FB}$ to cross $v_{REF}$, about 160 ps for the comparators 104 to switch, and about 200 ps for the digital delay through ZVS logic and bridge buffers. With this relatively short delay time, $C_{CRIT}$ utilized to achieve the specifications in Table 1 can be as low as about 20 nF, according to eq. (19). An IVR with a similarly-configured power train and $f_{sw}$ using a conventional feedback controller with latched PWM modulator would generally require $C_{OUT}$>100 nF. The total $C_{OUT}$ on the test chip is about 23 nF, including explicit MOS capacitors and non-switching gate capacitance from the digital load.

According to another aspect of the disclosed subject matter, four independent 64-tile NoCs 202 can be utilized as a realistic digital load for the IVR. The NoC 202 provides a relatively-highly scalable platform for exploring granular power distributions, where traffic patterns can be used to modulate load currents and transients. In this manner, NoCs 202 can be utilized as a basic interconnect infrastructure for complex SoCs. Since communication can be a factor in SoCs, and since NoCs 202 can have relatively strict energy and performance requirements, a separate voltage-clock domain for the NoC 202 alone can be reserved.

In some SoCs, NoCs 202 can be configured to support an increasing number of traffic classes and communication protocols. Adding virtual channels (VCs) to a NoC 202 can reduce deadlock and improve the bandwidth of the physical channels in exchange for a relatively more complex design of the routers. Additionally or alternatively, multiple parallel physical networks ("multiplanes" or "MPs") can be built with relatively smaller channels and simpler router organizations. While VCs can achieve higher performance then MPs, MPs can be more flexible and more suitable for applications with a limited power budget. The NoC 202 in this configuration can be organized as MPs, which can be generally easier to implement and configure to conserve power. Further details of the NoC 202 are discussed below.

Figure 8:
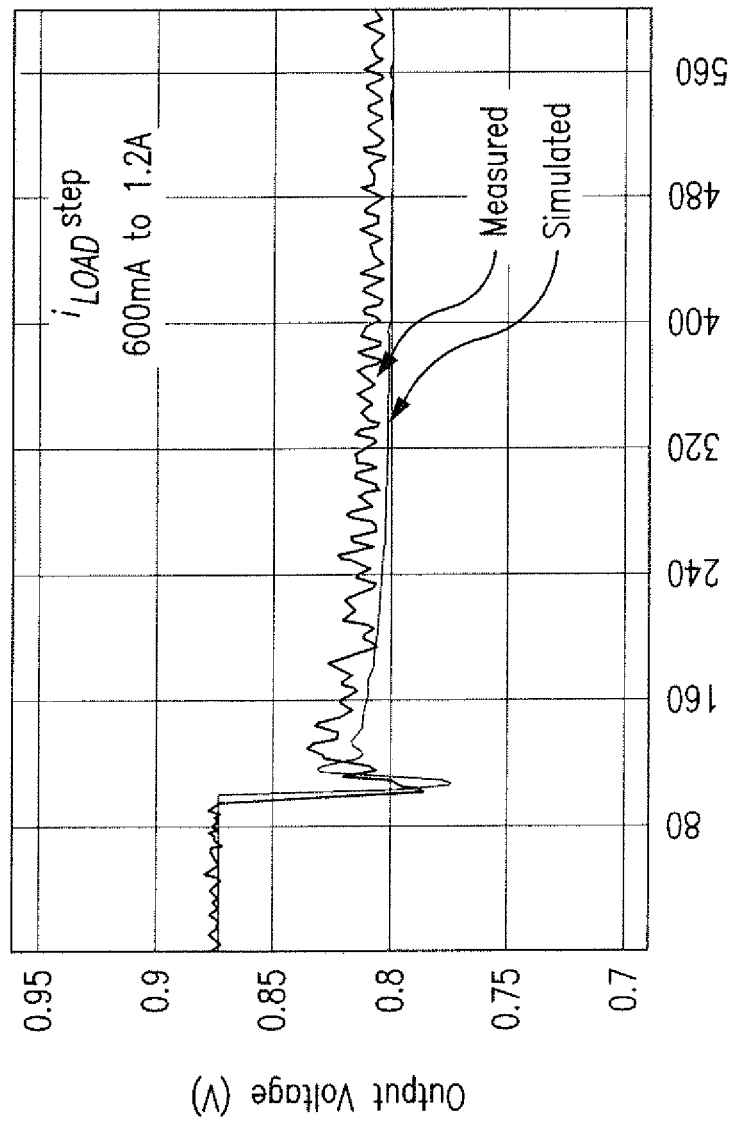
FIG. 8 is a diagram illustrating further features of the integrated circuit of FIG. 6.
Figure 9:
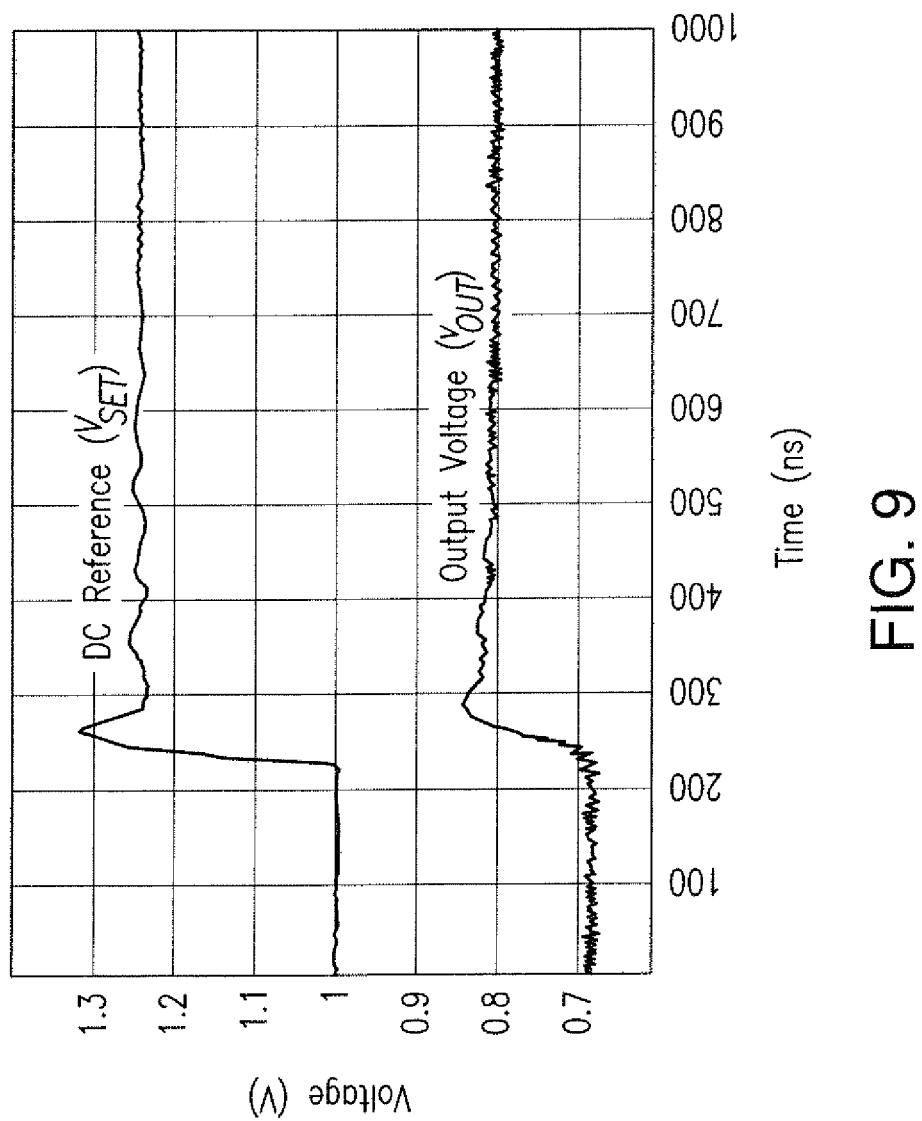
FIG. 9 is a diagram illustrating further features of the integrated circuit of FIG. 6.

The measured response of the test chip to a load current step from 0.6 A to 1.2 A in ~100 ps is shown in FIG. 8. The simulated behavior was determined from a time-domain Matlab model that can capture the nonlinear behavior of the control loop. The output voltage, $v_{OUT}$, follows the load-line with $R_{LL}$ of 125 m$\Omega$, and as such, a similarly-configured converter scaled to deliver 100 A can have $R_{LL}$ scaled to about 1.25 m$\Omega$. $V_{OUT}$ overshoots the load-line by about 30 mV, which agrees with the simulated results, with the exception of some ringing that occurs after the step. The ringing can be attributed to oscillation between $C_{OUT}$ and the bondwire inductance on the ground return of the load. The estimated resonant frequency of the series LC, 75 MHz, is approximately the same as the frequency of ringing, shown in FIG. 8. FIG. 9 shows the input step-up response, with a settling time for $V_{OUT}$ of about 70 ns.

To verify the power controller 100 switching stability and noise immunity in closed-loop operation, efficiency was measured while the converter operated in open- and closed-loop with similar operating conditions. The open-loop configuration can bypass the comparator to directly drive the bridge with a fixed duty cycle, producing a $V_{OUT}$ of 1 V with $i_o$ of 1 A at $f_{sw}$ of 80 MHz. The power controller 100 was subsequently configured to deliver similar output voltage and current at 80 MHz $f_{sw}$ in a closed-loop configuration. In both open- and closed-loop configuration, the efficiency was about 78%, and the spectral content of the output voltage peaked at about 320 MHz, which represents the expected effective switching frequency $Nf_{sw}$.

Figure 10:
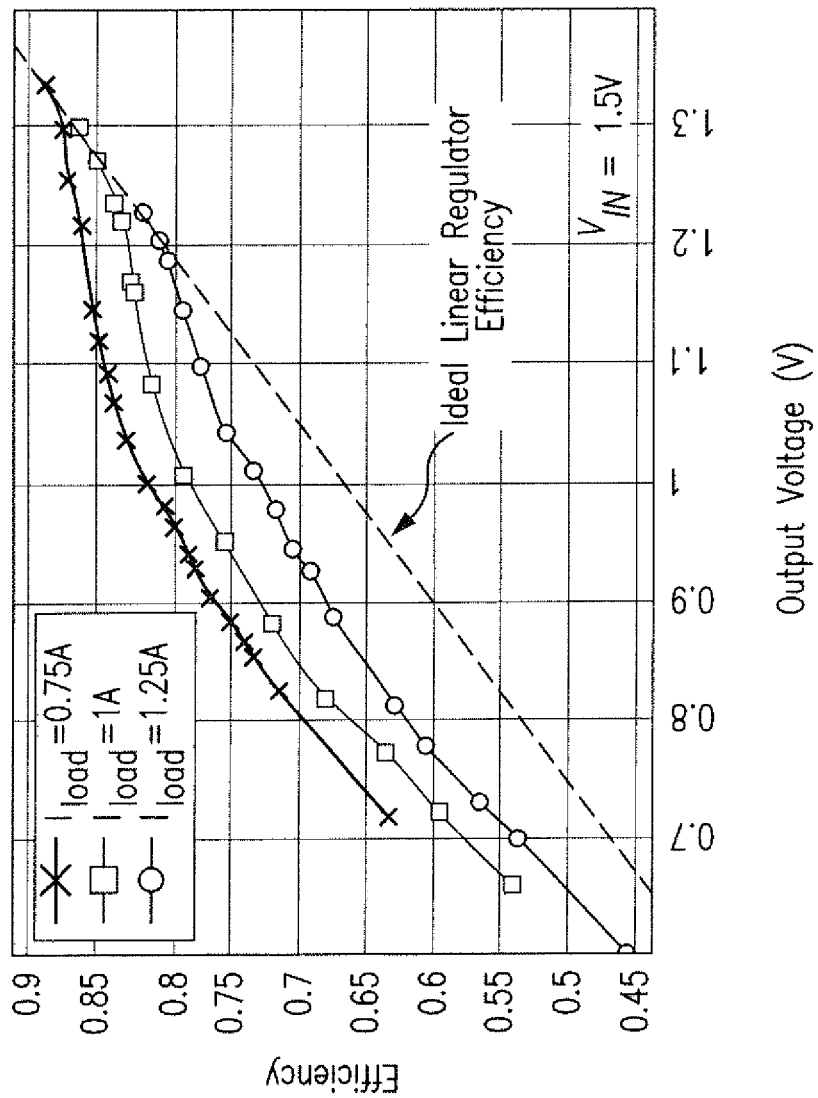
FIG. 10 is a diagram illustrating further features of the integrated circuit of FIG. 6.
Figure 11:
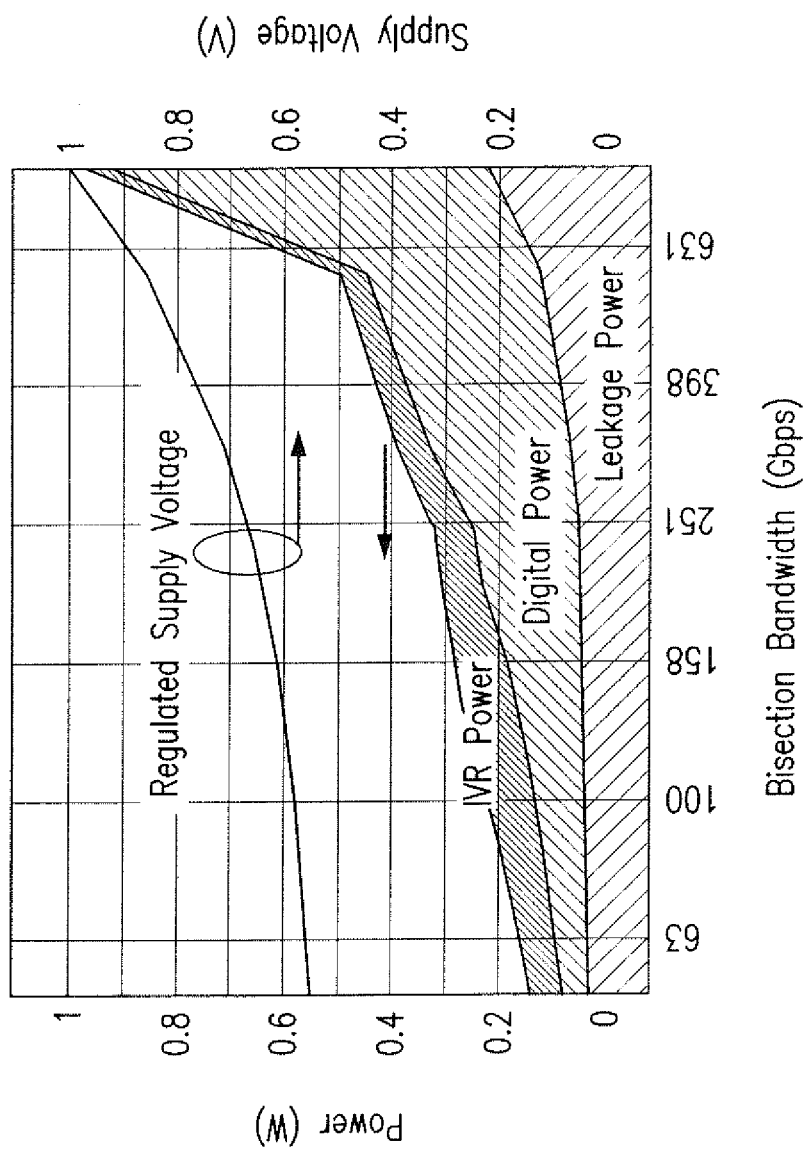
FIG. 11 is a diagram illustrating further features of the integrated circuit of FIG. 6.

The power controller 100 efficiency, as shown in FIG. 10, can be hindered by the relatively high $\tau'_{SL}$ of 120 m$\Omega$, which can be dominated by bond wire resistance. The efficiency for $v_{OUT}$<900 mV can be further adversely impacted by an ESD diode at the $v_{BRIDGE}$ node that can turn on with decreasing $v_{OUT}$. The efficiency can therefore be improved by removing the ESD diode and using an alternative packaging strategy that reduces $\tau'_{SL}$. The data in FIGS. 8-10 was taken from a single unit. However, the efficiency of four units were measured as a check, exhibiting variation that was below the noise of the measurement, with each achieving an efficiency of about 83% at a current density of about 1 A/mm$^2$ (or about 2.35 A/mm$^2$ if decoupling capacitor area is not considered) and about a 0.66 conversion ratio. The control scheme can thus allow for about 5× reduction in the output capacitance compared to an IVR with a conventional control scheme. This corresponds to about 2.2× improvement in total current density for the IVR implementation described herein, where $C_{OUT}$ can be implemented with on-chip MOS capacitance. FIG. 11 illustrates the power consumption of the test chip 200 with scaled NoC 202 supply voltage and frequency (i.e., bandwidth). FIG. 11 also illustrates that the power consumption of the system can decrease when the power supply of the NoC 202 is scaled, thus demonstrating the potential power savings that can be achieved with DVFS.

Figure 12:
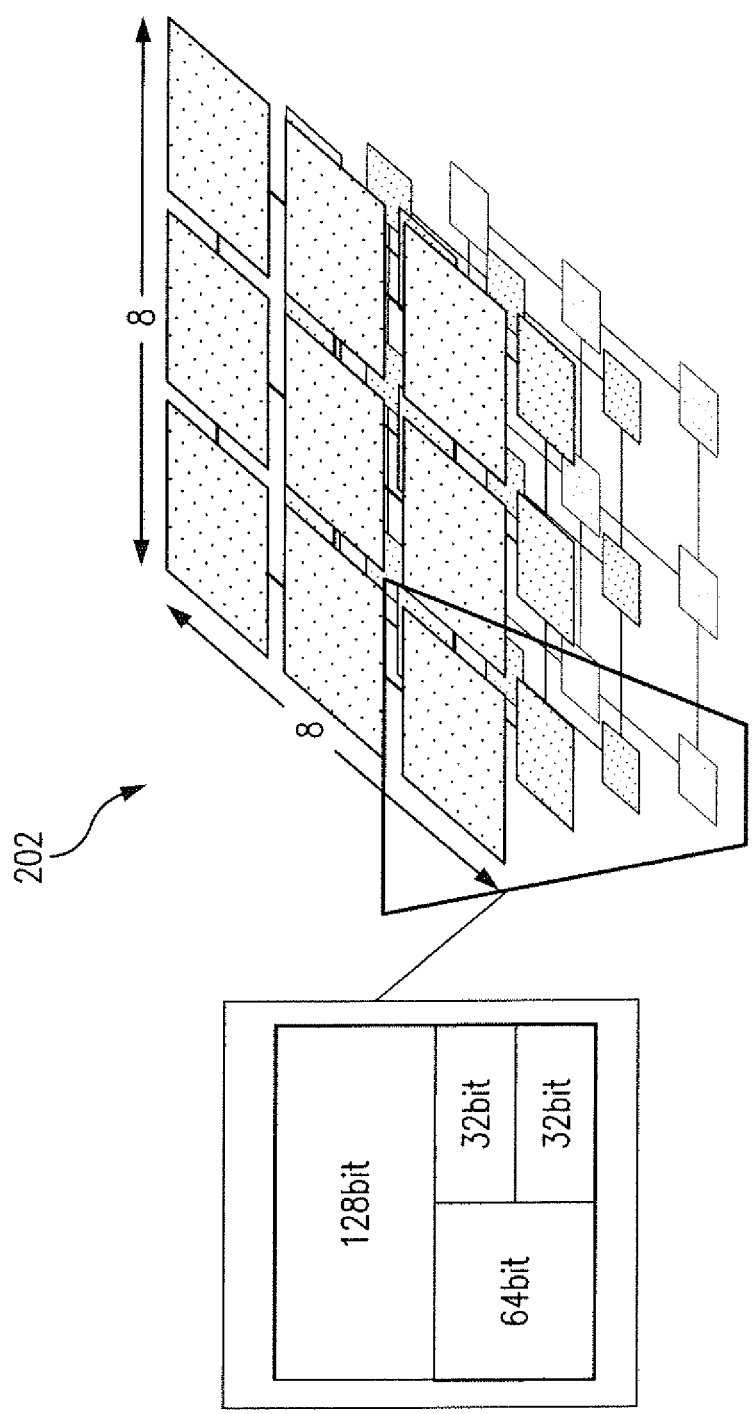
FIG. 12 is a diagram illustrating an exemplary network-on-chip (NoC) according to the disclosed subject matter.

According to another aspect of the disclosed subject matter, the exemplary NoC 202 as discussed herein above, can have four independent planes. Each plane can be organized as an eight-by-eight 2D-mesh NoC, as shown for example in FIG. 12. Each plane can support a different data parallelism: 128, 64, 32 and 32 bits, respectively, and each plane can have an independent global clock. All planes can share the common power supply provided by the IVR. In aggregate, the entire NoC 202 can have 256 routers and a bisection bandwidth of 2 kbit/T, where T can represent the clock period. For example, all the NoCs 202 can be configured to operate at a clock frequency of 500 MHz (T=2 ns), and thus the bisection bandwidth can be 1 Tbit/s.

All planes can utilize wormhole flow control and XY dimension-order routing, which can be relatively simple to implement with reduced deadlock for 2D mesh networks. The 2D-Mesh topology can be achieved using five-by-five routers, as shown for example in FIG. 13, where four I/O ports can be attached to neighbor routers, and the fifth port can be used for traffic injection/ejection. The router can be a traditional input-queued router. A five-by-five crossbar can connect each input to every output, and a simple per-output distributed round-robin arbitration can resolve contentions when multiple input packets request to be forwarded to the same output port.

Ack-Nack can be utilized as link-level flow control between adjacent routers. As such, two signals can be added to the data bus that carries the flits. One signal can validate the flit at a given clock cycle, while the other wire can transport back-pressure information. Back-pressure can be utilized by the downstream router to signal congestion to the upstream router. Under congestion, the input queue of a router generally fills up, and when filled, the flit currently in route on the link can fail to be stored properly, and thus the upstream router can be configured to maintain the old flit on the output port so that it can be correctly received by the downstream router when the congestion is resolved. Under persistent congestion, as no new flits can be forwarded towards the busy output port, the input queue occupation in the upstream router can grow as well, and the back-pressure can be propagated backward, up to the traffic source when necessary.

Figure 13:
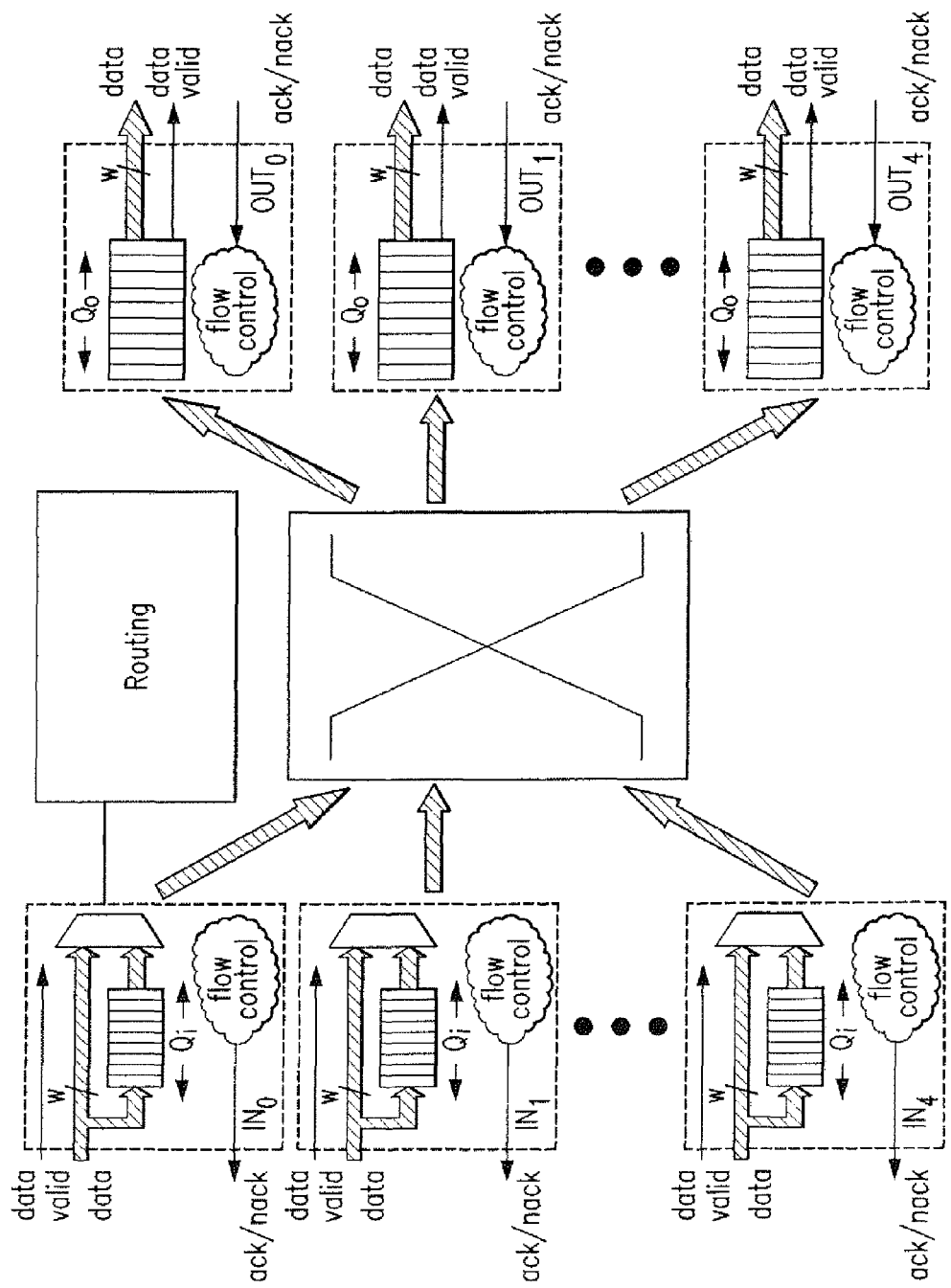
FIG. 13 is a diagram illustrating further features of the NoC of FIG. 12.

A relatively constant depth of $Q_i$=2 flits can be used for all the input queues, and can depend on the desired topology in the form factor of the chip. Every router can have a synchronous output, i.e., $Q_o$=1. As shown in FIG. 13, a bypassable input queue can be utilized so that the zero-load latency of traversing one router can be configured to be one clock cycle. Under no congestion, the incoming flit can bypass the input queue and be routed and stored directly in the appropriate output register. The input queue can be used to store the incoming flits while under congestion until the congestion can be resolved. Relay-stations (RS) can be configured on the links between adjacent routers. RSs can be implemented as synchronous flow-control aware repeaters, which can increase the modularity of the design and facilitate timing closure during layout, while also operating as distributed buffers, which can expand the capacity of the router input queues, and thus reduce congestion. In this manner, RS can be utilized to correct timing exceptions in a relatively flexible way, without changing the queue sizing within the routers or the network topology. The traffic injected at each router can be generated according to externally programmable parameters, and can support at least four synthetic random traffic patterns: uniform, tornado, transpose and hot-spot. The results described herein were obtained by averaging across different traffic patterns and traffic injection rates.

The invention claimed is:

1. A power controller, comprising:
an output terminal having an output voltage;
at least one clock generator to generate a plurality of clock signals;
a plurality of hardware phases, each hardware phase being coupled to the at least one clock generator and the output terminal and including a comparator, each hardware phase being configured to:
receive a corresponding one of the plurality of clock signals and a reference voltage;
combine the corresponding clock signal and the reference voltage to produce a reference input;
generate a feedback voltage based on the output voltage;
compare the reference input and the feedback voltage using the comparator; and
provide a comparator output to the output terminal, whereby the comparator output determines a duty cycle of the power controller;
wherein the comparator comprises a zero voltage switching logic (ZVS);
wherein the comparator is configured to generate non-linear feedback gain.

2. The power controller of claim 1, wherein the plurality of hardware phases comprise four hardware phases.

3. The power controller of claim 1, wherein the plurality of hardware phases comprise unlatched hardware phases.

4. The power controller of claim 1, wherein each of the plurality of clock signals has a different phase.

5. The power controller of claim 1, wherein the reference input comprises a triangle wave potential.

6. The power controller of claim 5, wherein the triangle wave potential is centered at a desired DC output voltage of the power controller.

7. The power controller of claim 1, further comprising a bridge switching node having a bridge switching node voltage, the feedback voltage being further based on the bridge switching node voltage.

8. The power controller of claim 7, wherein the bridge switching node voltage is determined from an inductor current of the bridge switching node.

9. The power controller of claim 1, wherein the comparator is an unlatched continuous comparator.

10. An integrated circuit chip comprising the power controller of claim 1.

11. The integrated circuit chip of claim 10, further comprising one or more network-on-chip coupled to the power controller.

12. The integrated circuit chip of claim 11, wherein the one or more network- on-chip comprises four networks-on-chip, each network-on-chip having 64 cores.

13. A method comprising:
for each one of a plurality of hardware phases, each hardware phase being coupled to at least one clock generator and an output terminal and including a comparator:
receiving a corresponding one of a plurality of clock signals from the at least one clock generator and a reference voltage;
combining the corresponding clock signal and the reference voltage to produce a reference input;
generating a feedback voltage based on an output voltage from an output terminal;
comparing the reference input and the feedback voltage using the comparator;
providing a comparator output to the output terminal, whereby the comparator output determines a duty cycle of a power controller;
wherein the comparator comprises a zero voltage switching logic (ZVS);
wherein the comparator is configured to generate a non-linear feedback gain.

14. The method of claim 13, further comprising providing the plurality of clock signals, each of the plurality of clock signals having a different phase.

15. The method of claim 13, further comprising providing the reference input, wherein the reference input comprises a triangle wave potential.

16. The method of claim 15, wherein providing the reference input comprises centering the triangle wave potential at a desired DC output voltage of the power controller.

17. The method of claim 13, generating the feedback voltage further comprises generating the feedback voltage based on a bridge switching node voltage from a bridge switching node.

18. The method of claim 17, further comprising determining the bridge switching node voltage from an inductor current of the bridge switching node.

* * * * *